United States Patent

Reichert

[11] Patent Number: 5,711,431
[45] Date of Patent: Jan. 27, 1998

[54] CLIP ORDER RACK

[76] Inventor: Cory A. Reichert, 1416 Ironwood Ave., Salt Lake City, Utah 84121

[21] Appl. No.: 649,199
[22] Filed: May 17, 1996
[51] Int. Cl.$^6$ ................................................ A47F 5/00
[52] U.S. Cl. .......................... 211/45; 211/122; 211/89
[58] Field of Search .......................... 211/45, 47, 89, 211/122, 10, 1.52, 1.53, 1.55, 1.56, 1.57, 77, 162; 248/309.1; 206/481, 482; 198/678.1, 681, 685, 465.2; D6/322; 40/124, 124.4, 500, 504, 506

[56] References Cited

U.S. PATENT DOCUMENTS

| | | | |
|---|---|---|---|
| 692,500 | 2/1902 | Barnett | 211/45 |
| 759,190 | 5/1904 | Pope | 198/681 |
| 1,293,410 | 2/1919 | Goodwin | 211/77 X |
| 2,595,837 | 5/1952 | Freeman | 211/45 X |
| 2,778,504 | 1/1957 | Byrne | 211/1.56 |
| 2,899,072 | 8/1959 | Weiss | 211/1.56 |
| 2,980,258 | 4/1961 | Collette | 211/122 X |
| 3,019,911 | 2/1962 | Collette | 211/122 |
| 3,314,177 | 4/1967 | Mies, Jr. et al. | 211/115 X |
| 3,727,745 | 4/1973 | Richterkessing | 211/1.56 X |
| 3,955,267 | 5/1976 | de Caussin | 211/1.53 X |
| 3,967,346 | 7/1976 | Young, Jr. | 211/89 |
| 4,461,387 | 7/1984 | Belokin, Jr. | 211/89 X |
| 5,533,632 | 7/1996 | Patterson et al. | 211/122 |

OTHER PUBLICATIONS

"Order Racks & Wheels", Toppo, p. 4 (Catalog) no date.

Primary Examiner—Robert W. Gibson, Jr.
Attorney, Agent, or Firm—Mallinckrodt & Mallinckrodt

[57] ABSTRACT

A clip order rack includes a loop, such as a belt or chain, mounted for free movement along a loop support having at least one straight section therein. Clips for removably holding paper guest checks are spaced along the loop so that a check can be clipped to the loop at one location, such as by a waitress, and the loop moved along the loop support to move the check to another location along a straight section of the loop where it can be observed along with adjacent checks, such as by a cook. The loop may be formed of a plurality of clip members pivotally attached in side-by-side relationship to form an endless chain.

20 Claims, 4 Drawing Sheets

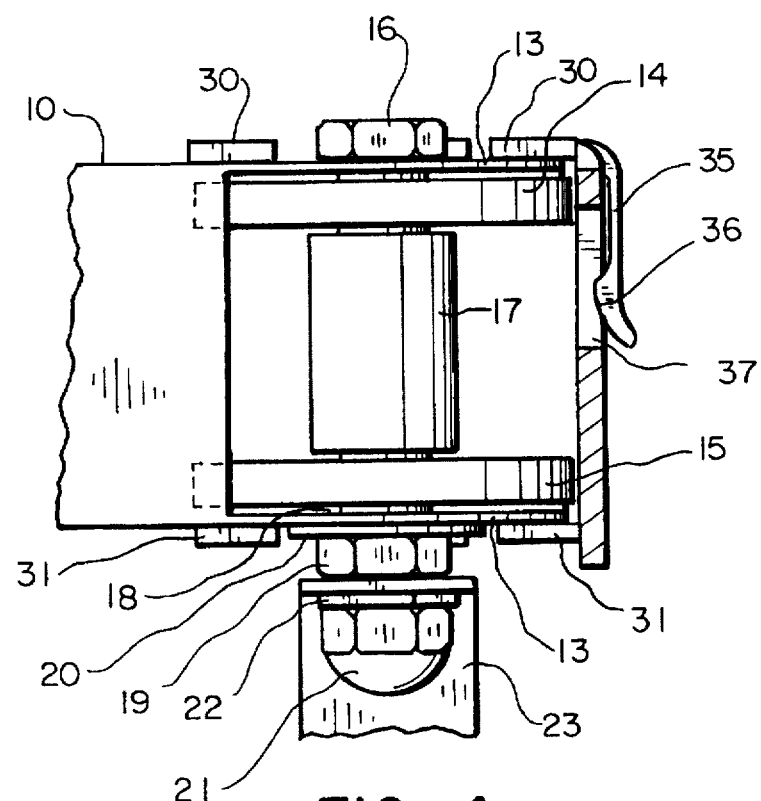
FIG. 4
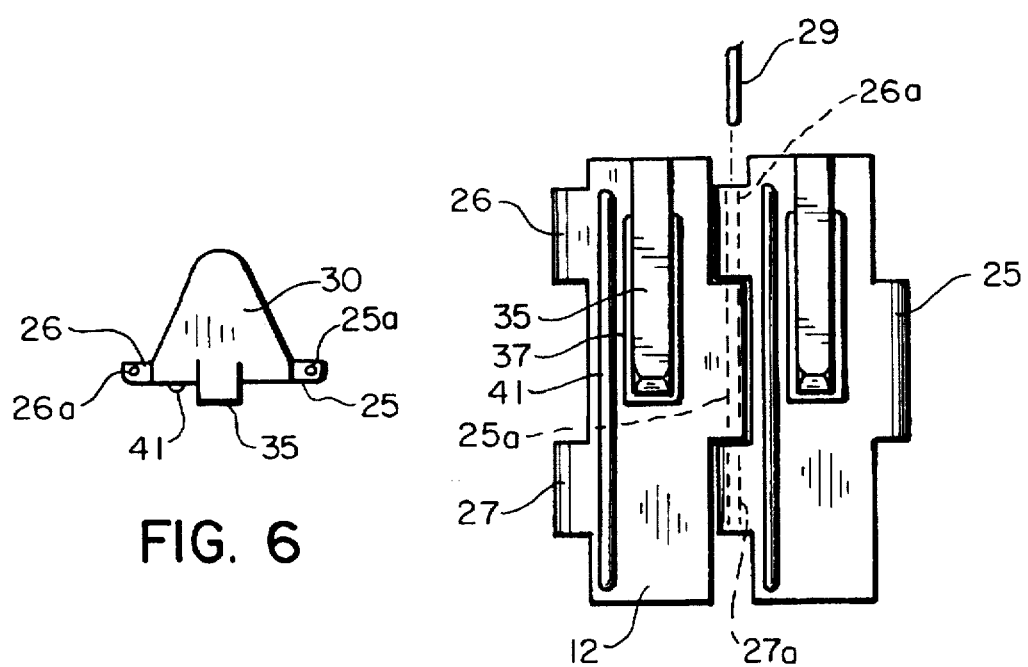
FIG. 6
FIG. 5

CLIP ORDER RACK

BACKGROUND OF THE INVENTION

1. Field

The invention is in the field of order racks and order wheels.

2. State of the Art

Order racks and order wheels are extensively used in restaurants. Typically, an order wheel is placed between an eating area where guests are served and the kitchen where orders are cooked. A waiter/waitress approaches the wheel from the dining area side and places a guest check indicating an order for food on an unused clip on the wheel. The cook approaches the wheel from the kitchen side of the wheel and looks at any order on a guest check on the kitchen side of the wheel to prepare the ordered food. If the wheel is relatively empty, the cook will rotate the wheel so that orders clipped thereto are rotated to a position in front of the cook so he or she can read the order. As an order is being prepared, the cook will rotate the wheel so that he or she can see the next order to begin its preparation. The wheel generally keeps the orders in order of time so the first order placed on the wheel is the first order started by the cook. When an order is completed, the check for such order is removed from the wheel and placed with the plate of food ordered on a counter for the waiter/waitress to pick up and deliver to the guest. When a check is removed from the wheel, the wheel is advanced by the cook to get to the next guest order check. While the order wheel is effective for moving guest checks from the waiter/waitress to the cook, particularly where the cook works on only one or two meals at a time, where several meals are being worked on at the same time, the cook has to continually turn the wheel back and forth to find the particular order being worked on and to keep the orders in time order on the wheel.

A slide order rack is a long straight rack placed in the kitchen area. The waiter/waitress passes an order check from the eating area to the kitchen area where the cook places the check in the slide order rack in a line in the time order received. When an order is completed, the check is removed and the remaining checks are slid down the rack one by one to fill the vacant area. The slide order rack has the advantage of allowing the cook to easily view more guest checks simultaneously than can be done with an order wheel. Thus, the cook can easily view all checks in the rack rather than just the check facing him in a check wheel. He can also easily see the time order of the checks, while also working on a number of orders at the same time.

The order wheel allows checks to be attached on one side of the wheel and turned so the check is viewed on the other side of the wheel, but allows only effective viewing of one or two checks by the cook without rotating the wheel. The order rack allows effective viewing of all checks on the rack by the cook but the checks have to be passed to the cook who then has to place the checks on the rack and has to move individual checks with the flow of orders.

SUMMARY OF THE INVENTION

According to the invention, a clip order rack has an endless loop which includes clip members adapted to removably accept and hold guest checks. The endless loop is mounted for free movement on a loop support which forms an endless track for the loop, and which has at least one straight section. Guest checks may be inserted into clip members by a waiter/waitress in a dining area and the loop moved around the track to move the guest checks into the kitchen area. The at least one straight section is located in the kitchen area and is long enough to display a plurality of guest checks held side-by-side by the loop along the straight section to be easily seen by a person in the kitchen area. In this way a cook can easily view a number of side-by-side checks as with a check rack, and the waiter/waitress can insert the checks into the rack. The cook merely rotates the loop to bring the checks into view and he or she does not have to move each check individually down the rack when an order is completed and a check removed from the rack. When the lead check is removed from the rack, the loop is rotated to move all checks simultaneously. If a check is removed out of order, as when the order thereon is completed more rapidly than the first check on the rack, the space where the check has been removed can remain until the first check is removed and the loop moved to move all checks. The straight section should be long enough to hold at least the number of checks representing the number of orders a cook is expected to be preparing simultaneously.

In a preferred embodiment of the invention, the loop is made up of clip members hingedly secured together to form an endless chain. The clip members may be substantially rectangular in shape with a clip arm running lengthwise from the top central area of the clip member to about the center of the clip member. The sides of the clip members contain side tabs extending therefrom. A single tab extends from one side of the clip member while two tabs extend from the opposite side spaced apart a distance to receive a single tab of an adjacent clip member therebetween. A hinge pin extends through the two spaced tabs and the single tab received therebetween to pivotally attach adjacent clip members. Adjacent clip members are joined as stated above until an endless chain of desired length is created.

Clip members have spaced upper and lower mounting tabs at the top and bottom portions of each clip member extending from the clip member face opposite that having the clip arm. The endless chain of clip members is mounted on a chain support forming an endless track with a perimeter just slightly less than the length of the endless chain and a width just slightly less than the distance between the spaced mounting tabs so that the track fits between the mounting tabs and the endless chain is held on the track by the spaced mounting tabs. The tabs of the clip members and the faces of the clip members from which the tabs extend slide along the perimeter of the chain support so that the chain can be easily moved along the track. The chain support may conveniently be a hollow rectangular beam as made of aluminum or plastic with rounded ends. Wheels can be mounted in the ends to reduce sliding friction as the chain moves around the ends.

THE DRAWINGS

The best mode presently contemplated for carrying out the invention is illustrated in the accompanying drawings, in which:

FIG. 1 is a perspective view of clip order rack of the invention;

FIG. 2 a fragmentary vertical section taken on the line 2—2 of FIG. 2 and drawn to a larger scale;

FIG. 3 a fragmentary top plan view of an end of the clip order rack of FIG. 1;

FIG. 4 a fragmentary side elevation of the end of the loop support taken on the line 4—4 of FIG. 3;

FIG. 5 a front elevation of two side-by-side individual clip members;

FIG. 6 a top plan view of an individual clip member;

FIG. 7 a front elevation of three pieces of an alternate embodiment of chain; and FIG. 8 a fragmentary front elevation of a belt embodiment of loop rather than a chain embodiment of the prior figures.

DETAILED DESCRIPTION OF THE ILLUSTRATED EMBODIMENT

Figure 1:
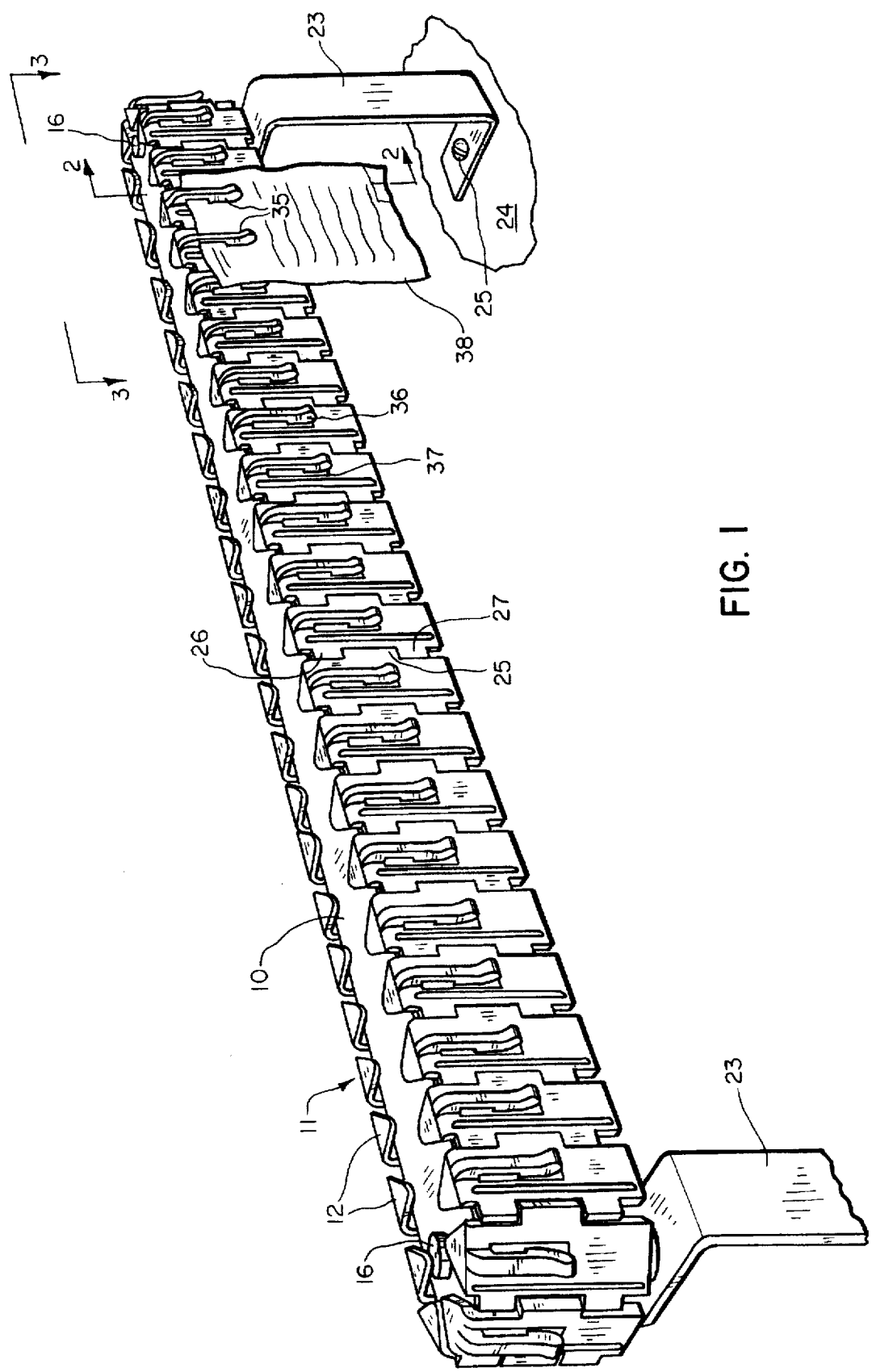

As illustrated, a preferred embodiment of the invention includes a hollow rectangular beam 10 which forms a loop support for an endless loop 11 in the form of a chain made up of plurality of clip members 12. The loop support 10 has rounded ends 13 and has upper and lower wheels 14 and 15 rotatably mounted in the ends by bolts 16 which extend through beam 10 to form a shaft for wheels 14 and 15. Sleeve 17, FIGS. 2 and 4, spaces wheels 14 and 15 apart while washer 18 acts as a bearing for lower wheel 15. Nut 19 with lock washer 20 secures bolt 16 to beam 10 while nut 21 with lock washer 22 secures beam 10 to mounting brackets 23. As shown, mounting brackets 23 are mounted to extend downwardly from beam 10 to mount beam 10 above a surface, such as above a counter surface 24, FIG. 1, by screw 28. Variously shaped and sized brackets can be used to mount beam 10 to any desired surface such as a wall, or bracket 23 could be secured to the top of beam 10 by bolt 16 to extend upwardly therefrom to mount to a ceiling or other surface above the rack.

Chain 11 is made up of a plurality of clip members 12 pivotally mounted in side-by-side relationship to form an endless chain. As shown in FIGS. 1 and 5, clip members 12 are basically rectangular in shape with a single centrally located tab 25 extending from one side thereof (the right side as illustrated, see particularly FIG. 5) and with two spaced tabs 26 and 27 extending from the opposite side (the left side as illustrated). Tabs 26 and 27 of a clip member 12 are spaced to receive tab 25 of an adjacent clip member therebetween. Each of the tabs 25, 26, and 27 have a longitudinal bore 25a, 26a, and 27a, respectively, FIGS. 5 and 6, therethrough through which a hinge pin 29 is inserted to pivotally connect adjacent clip members. Bores 26a and 27a can be smaller in diameter than bore 25a so that pin 29 is frictionally held in bores 26a and 27a while tab 25 can freely rotate about pin 29. A plurality of clip members are attached in this manner to form an endless flexible chain or loop around loop support member or beam 10.

Figure 2:
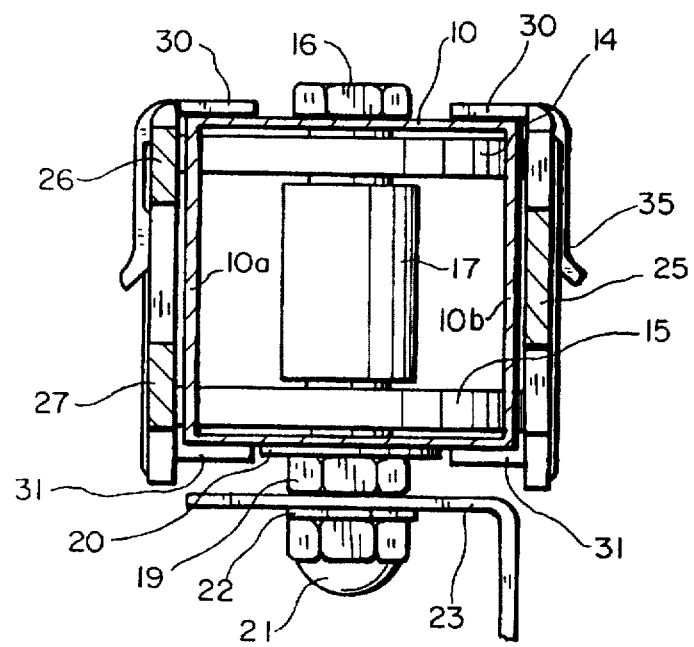
Figure 3:
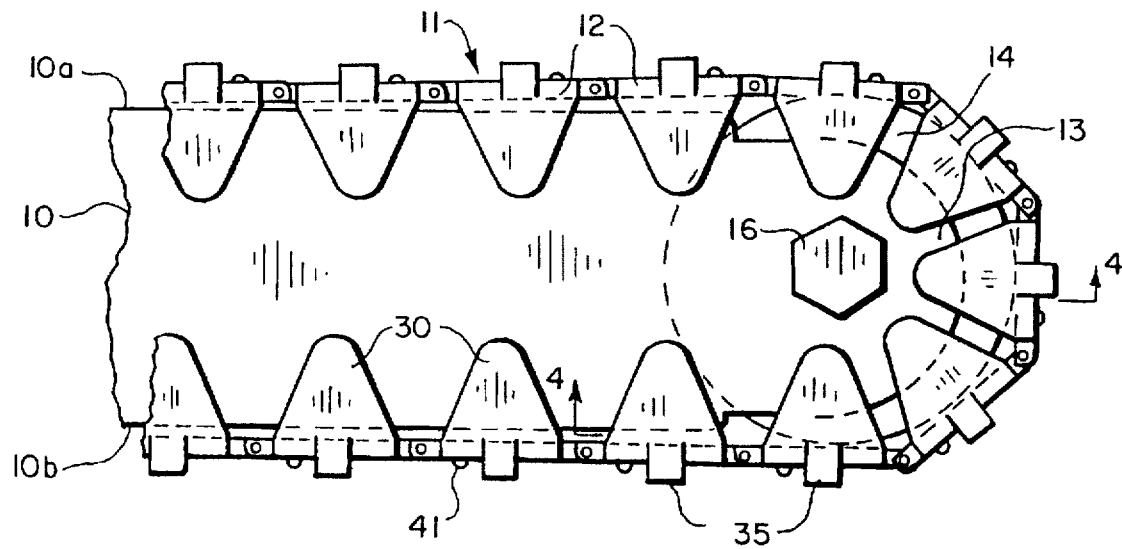

Each of the clip members 12 has an upper mounting tab 30 extending from the upper rear or back face of the clip member and a lower mounting tab 31, FIGS. 2 and 4, extending from the lower rear or back face of clip member 12. These mounting tabs 30 and 31 fit above and below beam 10 as shown in FIGS. 2 and 4 to slidably mount and hold the chain on beam 10. Mounting tabs 30 and 31 are substantially triangular in shape as shown in FIG. 3 so that adjacent tabs will not interfere with one another when turning a corner. In this manner chain loop 11 extends around beam 10 and around wheels 14 and 15 at each end of beam 10. The diameter of wheels 14 and 15 are slightly larger than the distance between opposite sides 10a and 10b of beam 10 as shown in FIGS. 2 and 3 to space the back faces of the clip members 12 slightly from beam 10 to thereby reduce the friction as the chain or loop 11 is moved around beam 10. While this is presently preferred, this is not necessary and wheels 14 and 15 could be eliminated so that chain or loop 11 would slide along beam 10 and around the curved ends of such beams.

The front face of clip member 12 includes a clip arm 35 with rounded hook end 36, FIGS. 1 and 4, which extends in normal position into opening 37 in clip member 12. The strength of clip arm 35 in combination with the shape of hook end 36 and its normal location in opening 37 is such that a paper guest or order check 38, FIG. 1, can be easily inserted under or pulled from under one or more clip arms 35 and be held in position by such one or more clip arms 35 as the chain is moved around its support 10. An optional ridge 41 may be provided on the front face of clip member 12 to provide additional bend to the paper of check 38 to hold it more securely. Ridge 41 may be parallel to arm 35 and opening 37, as shown, or at any desired angle. Ridge 41 could also provide reinforcement and stiffness to clip member 12, if necessary.

Figure 7:
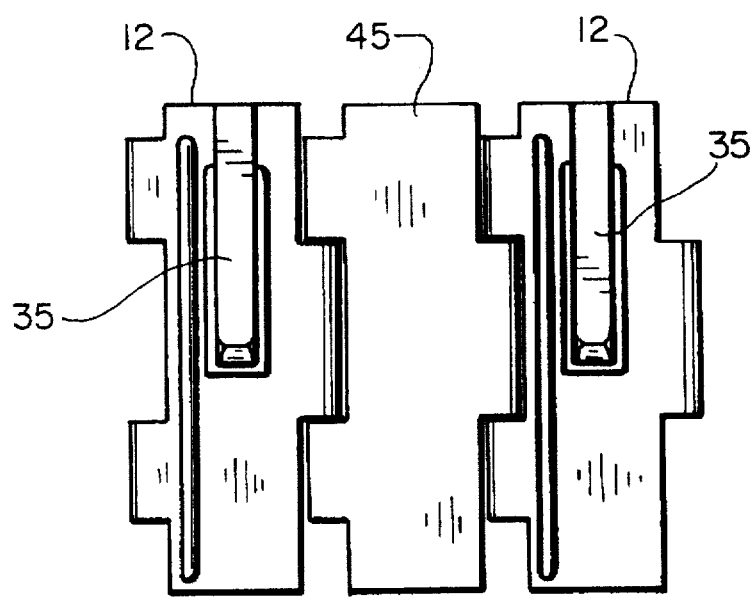

Rather than making each link of the chain or loop 11 with a clip member 12, one or more spacer members 45, FIG. 7, similar in configuration to clip members 12 but without clip arm 35, could be connected between clip members 12. This would space clip members 12 with clip arms 35 further apart along the chain so, if desired, could space the clip arms 35 so that only a single arm would hold each guest check rather than the two arms shown in FIG. 1. The spacer member could be of any desired configuration with or without mounting tabs 30 and 31.

In addition, while the loop support shown forms a track for the chain comprising two parallel elongate sides of the support, various shaped supports could be used. The important feature is that at least one substantially straight section is provided of a length to hold a plurality of guest checks in side-by-side configuration. The number of checks to be held by the straight section would vary with the use of the rack. In restaurant use, it would hold the number of checks with orders for which a cook is normally expected to be simultaneously working on. This will vary with the type of restaurant involved.

Figure 8:
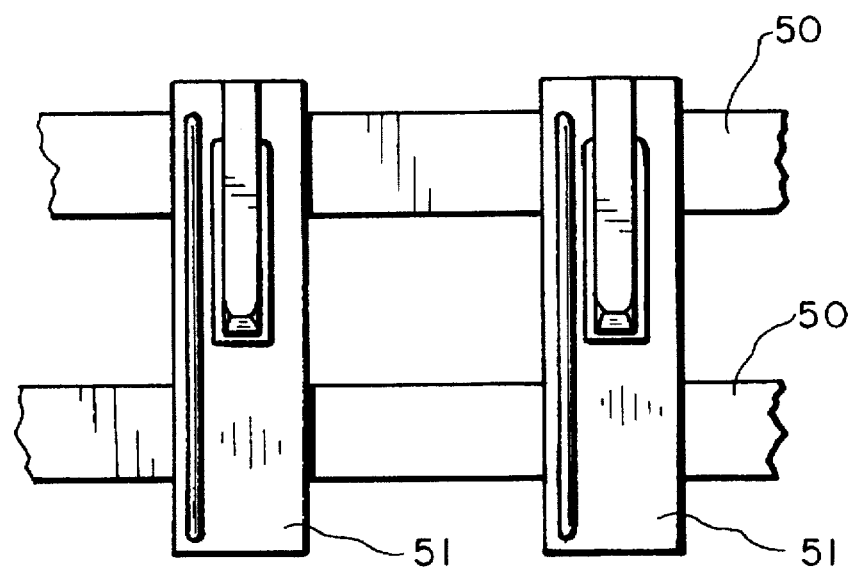

While the loop has been shown in the form of a chain formed by clip members pivotally attached in side-by-side relationship, it should be realized that the loop could take other forms. For example, the loop could be in the form of a belt or pair of belts 50, FIG. 8, to which clips are attached at spaced intervals along the length of the loop. The belt or belts could be mounted on the support by means of pulleys at the ends of the support, or by other means. Clip members 51 similar to clip members 12 but without connecting tabs 25, 26, and 27 could be secured to a belt along its length with the loop mounted and held on the support by mounting tabs on the clip members. The clip member 51 could be secured to the belts in any appropriate manner such as by rivets, bolts, or adhesives.

In use for restaurant service, the clip order rack of the invention would normally be mounted similarly to an order wheel so that a waiter/waitress would have access to one side of the rack in the dining area of the restaurant and would stick the order checks under one or more of the clip arms. The cook or cooks would move the loop so that a series of checks would be on their kitchen side of the rack and visible during preparation of the ordered food. As the ordered food is prepared and is ready for serving, the appropriate check is removed from the rack and placed with the ordered food at a pick-up location for the waiter/waitress. As checks are removed from the rack, the loop is moved so that additional order checks are moved from the waiter/waitress side of the rack to the cook side of the rack. A desired plurality of checks are visible to the cooks at any given time so that the orders on that same plurality of checks may be simultaneously prepared.

While the order racks of the invention have been described for use in a restaurant environment, such racks can be used in various other environments as desired.

In addition, while the order racks are shown as manually operated so that a person, such as a cook in a restaurant environment, will manually move the loop as required, the rack could be motor driven. Thus, a motor could be incorporated into the rack with a switch with or without a speed control, so that a cook or other user of the rack could move the belt by operation of the switch. Further, the belt could be operated continuously at a predetermined speed that would allow a check to remain in the straight section for a period of time sufficient to allow the check to be aced on. Thus, for a restaurant, the waiter/waitress would clip the check in the closest available clip to the end of the loop entering the kitchen. The check would proceed to the straight section in the kitchen where a cook would observe the check as it entered the kitchen and begin preparation of the order. The speed of travel of the loop would be adjusted so that the cook would finish preparation of the ordered food and remove the check from the rack before the check reached the end of the straight section and moved back into the dining area of the restaurant.

Whereas this invention is here illustrated and described with reference to embodiments thereof presently contemplated as the best mode of carrying out such invention in actual practice, it is to be understood that various changes may be made in adapting the invention to different embodiments without departing from the broader inventive concepts disclosed herein and comprehended by the claims that follow.

I claim:

1. A clip order rack for holding guest checks, comprising:
   a loop support;
   a flexible loop mounted on said loop support whereby said loop may be freely rotated as guided by said loop support, said loop having at least one straight section;
   a plurality of clip members mounted on the loop, each clip member having a resilient clipping means to removably accept and hold guest checks; and
   means for mounting said loop support to hold said loop in an operable position.

2. A clip order rack according to claim 1, wherein the loop support forms an endless track, and wherein the flexible loop is in the form of an endless chain formed of link members pivotally joined in a side-by-side configuration, at least some of the clip members being link members.

3. A clip order rack according to claim 2, wherein the clipping means includes a resilient clip arm, wherein the clip member has a front face, and wherein the guest check is inserted between the resilient clip arm and the front face of the clip member.

4. A clip order rack according to claim 3, wherein the link members also include spacer members without clipping means for attaching a paper guest check thereto interposed between clip members.

5. A clip order rack according to claim 4, wherein clip members and spacer members are alternated in forming the endless chain.

6. A clip order rack according to claim 5, wherein the loop support provides a rectangular track over which the chain is slidably mounted.

7. A clip order rack according to claim 6, wherein the clip members have a rear face, and wherein spaced mounting tabs extend from the rear face to receive the rectangular track therebetween.

8. A clip order rack according to claim 7, wherein the loop support is an elongate rectangular beam with the chain extending along opposite sides of the beam.

9. A clip order rack according to claim 8, wherein the elongate rectangular beam has opposite ends and includes wheels mounted at said opposite ends about which the chain extends to move from one side of the beam to the opposite side thereof.

10. A clip order rack according to claim 9, wherein the elongate rectangular beam has a distance between its opposite sides, and wherein the diameter of the wheels at the opposite ends of the elongate rectangular beam is larger than the distance between opposite sides to thereby space the rear face of the clip members from the sides of the beam.

11. A clip order rack according to claim 1, wherein the flexible loop is in the form of at least one belt.

12. A clip order rack according to claim 11, wherein the clip members are attached to and spaced along the belt.

13. A clip order rack for holding guest checks, comprising:
   a chain support in the form of an endless track having at least one straight section;
   a plurality of clip members attached to form an endless chain each clip member having tabs extending therefrom cooperable with said endless track for positioning said endless chain on said endless track for manual sliding movement along said endless track and
   means for mounting said chain support to hold said endless chain in an operable position.

14. A clip order rack according to claim 13, wherein the endless chain is further comprised of a plurality of spacer members interposed between clip members.

15. A clip order rack for holding guest checks, comprising:
   a loop support having opposite elongate rectangular sides;
   a flexible loop mounted on said loop support for sliding movement along the opposite sides thereof;
   a plurality of clip members mounted on the loop for removably accepting and holding guest checks; and
   means for mounting said loop support to hold said loop in an operable position.

16. A clip order rack according to claim 15, wherein the loop support has opposite ends and includes wheels mounted at said opposite ends about which the flexible loop extends to move between opposite sides of the loop support.

17. A clip order rack according to claim 16, wherein the loop support has a distance between its opposite sides, and wherein the diameter of the wheels at the opposite ends of the loop support is larger than the distance between opposite sides to thereby space the rear face of the clip members from the sides of the beam.

18. A clip order rack according to claim 15, wherein the loop support forms an endless track, and wherein the flexible loop is in the form of an endless chain formed of link members pivotally joined in a side-by-side configuration, at least some of the clip members being link members.

19. A clip order rack according to claim 18, wherein the link members also include spacer members interposed between clip members.

20. A clip order rack according to claim 15, wherein the clip members have a rear face, and wherein spaced mounting tabs extend from the rear face to receive the rectangular sides therebetween.

* * * * *